United States Patent
Kasai

(10) Patent No.: US 8,531,084 B2
(45) Date of Patent: Sep. 10, 2013

(54) ULTRASONIC MOTOR UNIT

(75) Inventor: Yasuaki Kasai, Saitama (JP)

(73) Assignee: Olympus Corporation, Tokyo (JP)

( * ) Notice: Subject to any disclaimer, the term of this patent is extended or adjusted under 35 U.S.C. 154(b) by 275 days.

(21) Appl. No.: 13/180,731

(22) Filed: Jul. 12, 2011

(65) Prior Publication Data

US 2012/0013221 A1 Jan. 19, 2012

(30) Foreign Application Priority Data

Jul. 16, 2010 (JP) ................. 2010-162191

(51) Int. Cl.
*H02N 2/00* (2006.01)

(52) U.S. Cl.
USPC ........... 310/323.16; 310/323.02; 310/323.09; 310/323.13; 310/323.14; 310/323.17; 310/323.18

(58) Field of Classification Search
USPC ............ 310/323.01, 323.02, 323.08, 323.09, 310/323.13, 323.14, 323.16–323.18
See application file for complete search history.

(56) References Cited

U.S. PATENT DOCUMENTS

| | | | |
|---|---|---|---|
| 5,726,520 A * | 3/1998 | Grahn ........................... 310/328 |
| 6,380,660 B1 * | 4/2002 | Maeno et al. ............ 310/323.02 |
| 6,768,245 B2 * | 7/2004 | Mock et al. .............. 310/323.02 |
| 6,813,543 B2 * | 11/2004 | Aalund et al. ................. 700/245 |
| 7,865,268 B2 * | 1/2011 | Valdivia y Alvarado et al. .............................. 700/245 |
| 2005/0129495 A1 * | 6/2005 | Brogardh ...................... 414/680 |
| 2010/0084944 A1 * | 4/2010 | Suzuki ..................... 310/323.02 |
| 2012/0001519 A1 * | 1/2012 | Asai et al. ................ 310/323.02 |

FOREIGN PATENT DOCUMENTS

| | | |
|---|---|---|
| JP | 11-235062 | 8/1999 |
| WO | WO-2004-014244 A2 * | 2/2004 |

* cited by examiner

*Primary Examiner* — Thomas Dougherty
(74) *Attorney, Agent, or Firm* — Scully, Scott, Murphy & Presser, P.C.

(57) ABSTRACT

According to one embodiment, an ultrasonic motor unit includes a piezoelectric element, a holder member, a pressing member, a pressing auxiliary member, a driven member, an ultrasonic motor accommodation member, a power extraction member. The piezoelectric element has a rectangular cross-sectional shape. The holder member holds the piezoelectric element so as to cover an outer surface of a portion of the piezoelectric element. The pressing member applies a predetermined pressing force to the piezoelectric element. The pressing auxiliary member transfers a pressing force generated by the pressing member to the holder member. The driven member is in contact with one end face of the piezoelectric element. The power extraction member is coupled to the ultrasonic motor accommodation member to form a joint portion. The ultrasonic motor unit is formed by connecting a plurality of sections each formed by coupling the ultrasonic motor accommodation member to the power extraction member.

6 Claims, 5 Drawing Sheets

ULTRASONIC MOTOR UNIT

CROSS-REFERENCE TO RELATED APPLICATIONS

This application is based upon and claims the benefit of priority from prior Japanese Patent Application No. 2010-162191, filed Jul. 16, 2010, the entire contents of which are incorporated herein by reference.

BACKGROUND OF THE INVENTION

1. Field of the Invention

The present invention relates to an ultrasonic motor unit including an ultrasonic motor using a transducer such as a piezoelectric element.

2. Description of the Related Art

Recently, attention has been paid to an ultrasonic motor using the vibration of a transducer such as a piezoelectric element as a new motor replacing an electromagnetic type motor. This ultrasonic motor is superior to a conventional electromagnetic type motor in being capable of obtaining low-speed high thrust without gears, having high holding force, having high resolution, being low noise, producing no magnetic noise, and the like.

More specifically, there is known an ultrasonic motor of a type that excites elliptic vibration by applying a predetermined alternating voltage to the transducer and frictionally drives a driven member by using the elliptic vibration as a driving source. As a technique associated with such an ultrasonic motor, for example, the following technique is disclosed in Jpn. Pat. Appln. KOKAI Publication No. 11-235062.

That is, the vibration actuator driving device disclosed in Jpn. Pat. Appln. KOKAI Publication No. 11-235062 includes a transducer which vibrates in accordance with a driving signal, a ring-like relative motion member which is in contact with the transducer and makes relative motion in accordance with the vibration of the transducer, and a pressurizing support member which brings the transducer into contact with the relative motion member with pressure while supporting the transducer. In this case, the pressurizing support member includes a ring-like base portion, a leaf spring portion cantilevered to the base portion, and a support pin portion provided on the free end portion side of the leaf spring portion. According to the technique disclosed in Jpn. Pat. Appln. KOKAI Publication No. 11-235062, a vibration actuator driving device which can be mounted in even a small mounting space is provided.

The technique disclosed in Jpn. Pat. Appln. KOKAI Publication No. 11-235062 can drive a driven member only within a predetermined plane. For this reason, in order to implement an arrangement which can drive a driven member not only in an x-y plane but also in the z-axis direction perpendicular to the x-y plane, it is necessary to add a driving mechanism corresponding to another axis. In order to operate these driving mechanisms in cooperation with each other, some technical contrivance is required for the pressurizing support member as a pressing mechanism in terms of arrangement. Obviously, adding a driving mechanism corresponding to one axis will increase the size of the device itself. That is, increasing the degree of freedom of driving directions will increase the size of the device.

BRIEF SUMMARY OF THE INVENTION

The present invention has been made in consideration of the above situations, and has as its object to provide an ultrasonic motor unit which can achieve both an increase in the degree of freedom of driving directions and a reduction in the size of the device.

To achieve the above object, according to an aspect of the present invention, there is provided an ultrasonic motor unit comprising:

a piezoelectric element which is provided with a plurality of piezoelectric active regions and has a rectangular cross-sectional shape, and in which longitudinal vibration and bending vibration are excited by applying a predetermined alternating signal to the plurality of piezoelectric active regions to excite elliptic vibration in opposite end faces by combining the vibrations;

a holder member which holds the piezoelectric element so as to cover an outer surface of a portion of the piezoelectric element which corresponds to a common node of the longitudinal vibration and the bending vibration;

a pressing member which applies a predetermined pressing force to the piezoelectric element through the holder member;

a pressing auxiliary member which transfers a pressing force generated by the pressing member to the holder member;

a driven member which is in contact with one of the opposite end faces of the piezoelectric element and driven by elliptic vibration of the piezoelectric element;

an ultrasonic motor accommodation member which accommodates the piezoelectric element, the holder member, the pressing member, and at least one portion of the driven member; and a power extraction member to which a portion of the driven member accommodated in the ultrasonic motor accommodation member is fixed, and which is coupled to the ultrasonic motor accommodation member to form a joint portion which displaces when the driven member is driven, wherein the ultrasonic motor unit is formed by connecting a plurality of sections each formed by coupling the ultrasonic motor accommodation member to the power extraction member.

The prevent invention can provide an ultrasonic motor unit which can achieve both an increase in the degree of freedom of driving directions and a reduction in the size of the device.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below with reference to the views of the accompanying drawing.

Figure 1:
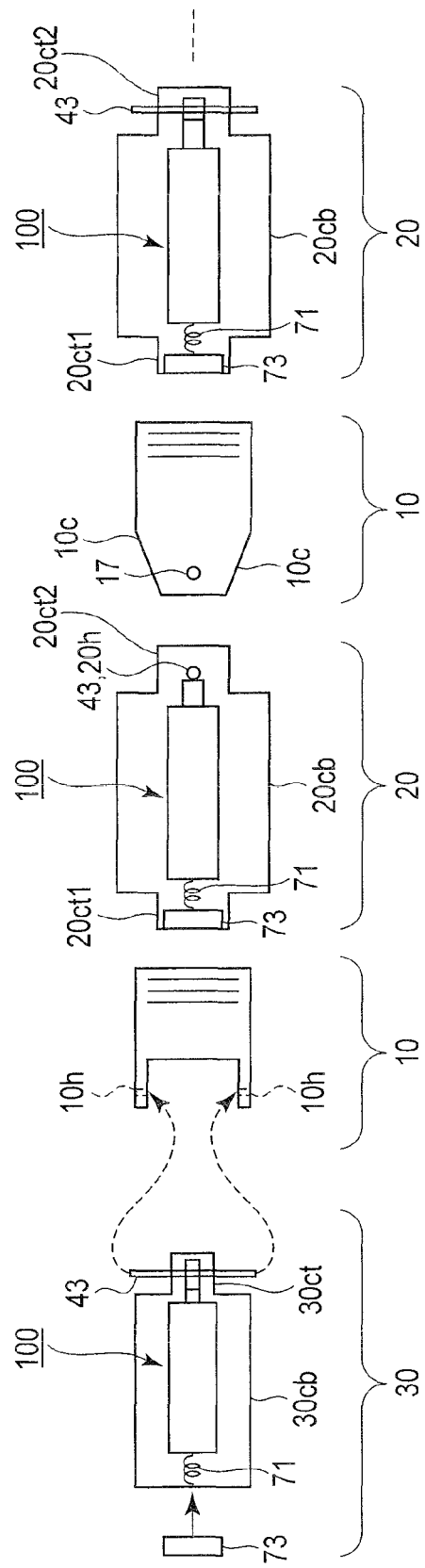
FIG. 1 is a schematic side view showing an example of the arrangement of an ultrasonic motor unit according to an embodiment of the present invention.

FIG. 1 is a schematic side view showing an example of the arrangement of an ultrasonic motor unit according to an embodiment of the present invention. As shown in FIG. 1, in the ultrasonic motor unit according to this embodiment, three types of units, namely a first unit 10, a second unit 20, and a third unit 30, are coupled to each other, as will be described below. The respective units and the coupling structures between the units will be described in detail below.

<<First Unit 10>>

Figure 2:
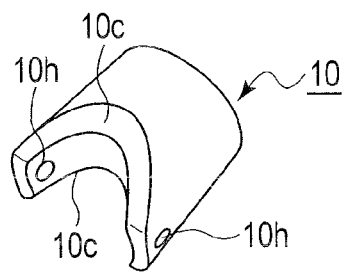
FIG. 2 is a perspective view showing an example of the arrangement of the first unit.

FIG. 2 is a perspective view showing an example of the arrangement of the first unit 10. The first unit 10 is a member having a nearly annular cross-sectional shape in which a pair of notched portions 10c are formed by a chamfering process. A pair of through hole portions 10h are formed in one end side (notched portion 10c side) of the first unit 10 so as to extend through it in the radial direction. The other end side of the first unit 10 is a threaded hole portion having a threaded portion (not shown) formed in its inner wall surface.

The pair of through hole portions 10h are through hole portions through which a shaft 43 forming a driven member 40 of an ultrasonic motor 100 (to be described later) extends. The through hole portions 10h and the shaft 43 are fixed to each other with, for example, an adhesive. In other words, the first unit 10 is coupled and fixed to the second unit 20 through the shaft 43. Likewise, the first unit 10 and the third unit 30 are coupled and fixed to each other through the shaft 43.

In other words, the first unit 10 is a power extraction member to which the output of the ultrasonic motor 100 is transferred through the shaft 43. That is, the first unit 10 forms a joint portion which displaces when the shaft 43 is driven.

Although described in detail later, the shaft 43 is configured to be pivotal about the second unit 20 and the third unit 30.

<<Second Unit 20>>

Figure 3A:
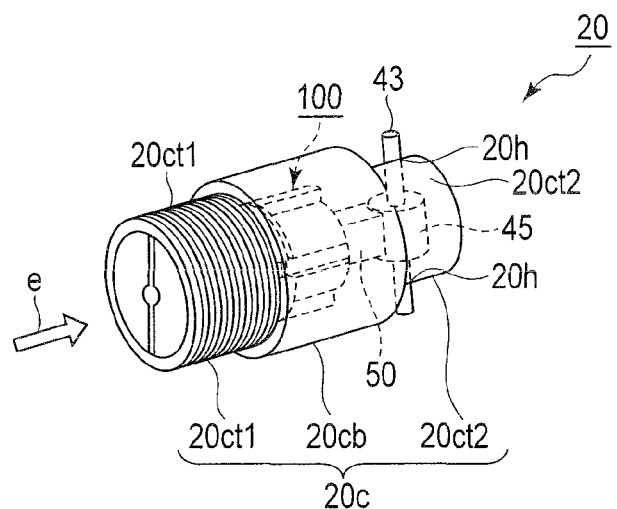
FIG. 3A is a perspective view showing an example of the arrangement of the second unit.

FIG. 3A is a perspective view showing an example of the arrangement of the second unit 20. The second unit 20 includes the ultrasonic motor 100 and a second case member 20c accommodating the ultrasonic motor 100. Note that FIG. 3A shows only some of the constituent members of the ultrasonic motor 100 for the sake of illustrative simplicity.

The second case member 20c is a member having a nearly annular cross-sectional shape, and includes convex portions 20ct1 and 20ct2 which are coupled to the first unit 10 and a main body portion 20cb for accommodating the ultrasonic motor 100. Although described in detail later, different first units 10 are respectively coupled to the convex portions 20ct1 and 20ct2 through difference coupling structures.

Figure 3B:
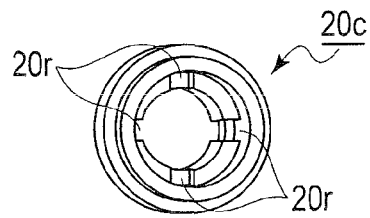
FIG. 3B is a perspective view showing the second unit viewed from the direction (end face side) indicated by an arrow e in FIG. 3A.

FIG. 3B is a view showing the second case member 20c viewed from the direction (end face side) indicated by an arrow e in FIG. 3A. That is, a thread to be threadably engaged with the threaded hole portion of the first unit 10 is formed in the outer surface of the convex portion 20ct1 provided on one end side of the second case member 20c. A thread with which a screw 73 (to be described later) is threadably engaged is formed in the inner diameter surface of the first unit 10. A pair of through hole portions 20h through which the shaft 43 (to be described later) extends are formed in the convex portion 20ct2 provided on the other end side of the second case member 20c.

Rotation restricting groove portions 20r are formed in the inner diameter surface of the main body portion 20cb of the second case member 20c along the longitudinal direction of the second case member 20c, as shown in FIG. 3B. The rotation restricting groove portions 20r are groove portions in which convex portions 51t (described in detail later) of a holder member 51 of the ultrasonic motor 100 and convex portions 61t (to be described later) of a pressing auxiliary member 60 are fitted.

Fitting the rotation restricting groove portions 20r on the convex portions 51t of the holder member 51 will fix a piezoelectric element 50 integrated with the holder member 51 in the second case member 20c.

Figure 4A:
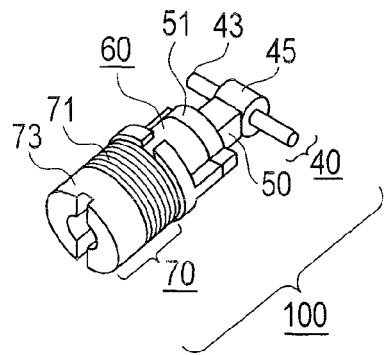
FIG. 4A is a view showing an example of the arrangement of an ultrasonic motor.
Figure 4B:
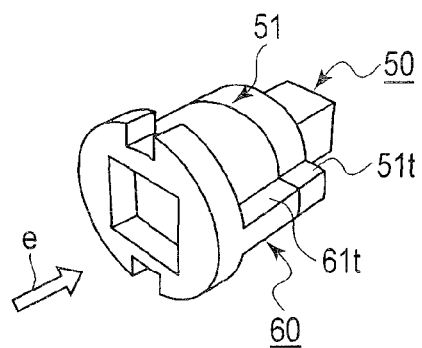
FIG. 4B is a perspective view showing a piezoelectric element and a pressing auxiliary member which constitute an ultrasonic motor.
Figure 4C:
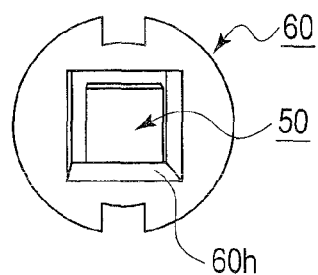
FIG. 4C is a view showing the ultrasonic motor viewed from the direction (pressing auxiliary member side) indicated by an arrow e in FIG. 4A.
Figure 5:
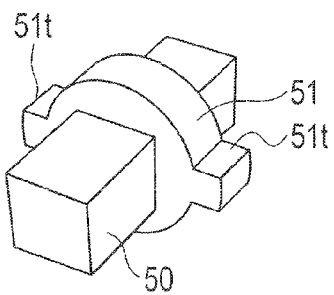
FIG. 5 is a view showing an example of the arrangement of a piezoelectric element.
Figure 6:
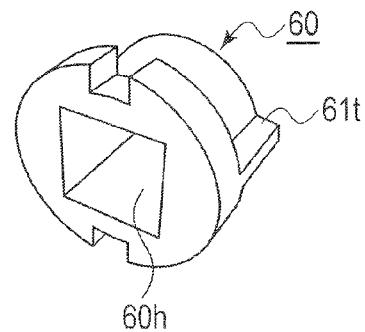
FIG. 6 is a view showing an example of the arrangement of a pressing auxiliary member.

FIG. 4A is a view showing an example of the arrangement of the ultrasonic motor 100. The ultrasonic motor 100 includes the driven member 40, the piezoelectric element 50, the holder member 51, the pressing auxiliary member 60, and a pressing member 70. FIG. 4B is a perspective view showing the piezoelectric element 50 and pressing auxiliary member 60 which constitute the ultrasonic motor 100. FIG. 4C is a view showing the piezoelectric element 50 and pressing auxiliary member 60 which constitute the ultrasonic motor 100 when viewed from the direction (pressing auxiliary member 60 side) indicated by an arrow e in FIG. 4B. FIG. 5 is a view showing an example of the arrangement of the piezoelectric element 50 and holder member 51. FIG. 6 is a view showing an example of the arrangement of the pressing auxiliary member 60.

The driven member 40 includes the shaft 43 and an abutment member 45, as shown in FIG. 4A. The shaft 43 extends through the pair of through hole portions 20h formed in the convex portion 20ct2 of the second case member 20c. The abutment member 45 is provided near the middle portion of the shaft 43 in the longitudinal direction so as to cover its outer surface of the shaft 43.

The abutment member 45 is a member constituting the driven member 40 of the ultrasonic motor 100, together with the shaft 43. The abutment member 45 is a member which has a nearly cylindrical shape and with which one end face of the piezoelectric element 50 is in contact. The abutment member 45 is frictionally driven by the piezoelectric element 50 with the elliptic vibration of the piezoelectric element 50 serving as a driving source. In this case, the abutment member 45 and the shaft 43 are fixed. Therefore, as the abutment member 45 rotates, the shaft 43 rotates together.

As shown in FIG. 5, the piezoelectric element 50 has a nearly rectangular parallelepiped shape. The holder member 51 having a nearly annular cross-sectional shape is provided on the piezoelectric element 50 so as to cover the outer surface of a region corresponding to the node of the longitudinal vibration and bending vibration which are excited in the piezoelectric element 50. The holder member 51 includes the pair of convex portions 51*t* protruding in the radial direction (the direction perpendicular to the direction of pressing by the pressing member 70). The pair of convex portions 51*t* are fitted in the rotation restricting groove portions 20*r* of the second case member 20*c* described above.

The piezoelectric element 50 is a piezoelectric element having a rectangular cross-sectional shape provided with a plurality of piezoelectric active regions. Applying a predetermined alternating signal to the plurality of piezoelectric active regions will excite longitudinal vibration and bending vibration in the piezoelectric element, which are combined to excite elliptic vibration. Note that the arrangement of the piezoelectric element 50 itself is not a characteristic part of the ultrasonic motor unit according to this embodiment, and hence a detailed description of it will be omitted.

As shown in FIG. 4A, the pressing auxiliary member 60 is a member which is in contact with the holder member 51 and the pressing member 70 and transfers the pressing force by the pressing member 70 to the piezoelectric element 50 through the holder member 51. One surface of the pressing auxiliary member 60 which is in contact with the holder member 51 has almost the same shape as that of an end face of the holder member 51. The other surface of the pressing auxiliary member 60 which is in contact with the pressing member 70 has an outer shape larger than the one surface. As shown in FIG. 4B, the pressing auxiliary member 60 is constituted by a region having a cross-section having the same shape as that of the one surface and a region having a cross-section having the same shape as that of the other surface.

As shown in FIG. 6, the pressing auxiliary member 60 includes the pair of convex portions 61*t* protruding in the radial direction (the direction perpendicular to the direction of pressing by the pressing member 70). The pair of the convex portions 61*t* are fitted in the rotation restricting groove portions 20*r* of the second case member 20*c* described above. Note that one of the pair of convex portions 61*t* is hidden due to the angle of observation of the pressing auxiliary member 60, and hence not shown in FIGS. 4B and 6.

The pressing auxiliary member 60 is provided with a through hole portion 60*h* into which the piezoelectric element 50 can be inserted in a noncontact state so as to hold the pressing auxiliary member 60 in noncontact with the piezoelectric element 50. Since this arrangement holds the pressing auxiliary member 60 and the piezoelectric element 50 in noncontact with each other, the pressing auxiliary member 60 does not hinder the vibration of the piezoelectric element 50.

Obviously, the pressing auxiliary member 60 may be integrally formed with the holder member 51.

As shown in FIG. 4A, the pressing member 70 includes a spring member 71 and a screw 73. The spring member 71 is provided to press the rear end face of the pressing auxiliary member 60 (the end face on the opposite side to the end face in contact with the holder member 51). The screw 73 is threadably engaged with the thread formed in the inner diameter surface of the convex portion 20*ct*1 of the second case member 20*c* and screwed into it so as to make the spring member 71 press the pressing auxiliary member 60.

With the above arrangement, the elastic force of the screw 73 screwed into the convex portion 20*ct*1 of the second case member 20*c* and the spring member 71 generates a pressing force applied to the piezoelectric element 50 through the pressing auxiliary member 60 and the holder member 51.

Bearings or the like are provided in the through hole portions 20*h*, and the shaft 43 rotatably extends through the through hole portions 20*h*. That is, as described above, the shaft 43 extends through the through hole portions 10*h* of the first unit 10 and is fixed in them while pivotally extending through the through hole portions 20*h* of the second case member 20*c*. The output of the ultrasonic motor 100 accommodated in the main body portion 20*cb* of the second case member 20*c* is transferred to the first unit 10 through the shaft 43.

<<Third Unit 30>>

Figure 7:
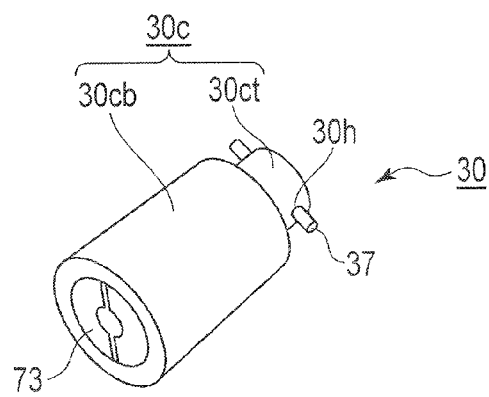
FIG. 7 is a perspective view showing an example of the arrangement of the third unit.

FIG. 7 is a perspective view showing an example of the arrangement of the third unit 30. The third unit 30 includes the ultrasonic motor 100 and a third case member 30*c* which accommodates the ultrasonic motor 100.

The third case member 30*c* is a member having a nearly annular cross-sectional shape, and includes a convex portion 30*ct* coupled to the first unit 10 and a main body portion 30*cb* accommodating the ultrasonic motor 100.

A pair of through hole portions 30*h* through which the shaft 43 extends are formed in the convex portion 30*ct* provided on one end side of the third case member 30*c*. Like the second case member 20*c* described above, the main body portion 30*cb* accommodates the ultrasonic motor 100.

The third case member 30*c* is a case member serving as the termination portion of the ultrasonic motor unit according to this embodiment. Therefore, this member does not have any member equivalent to the convex portion 20*ct*1 of the second case member 20*c*. This is a major difference from the second case member 20*c*. In this case, the convex portion 30*ct* of the third case member 30*c* is a member equivalent to the convex portion 20*ct*2 of the second case member 20*c*.

The through hole portions 30*h* are provided with bearings or the like. The shaft 43 rotatably extends through the through hole portions 30*h*. That is, the shaft 43 extends through the through hole portions 10*h* of the first unit 10 and is fixed in them while pivotally extending through the through hole portions 30*h* of the third case member 30*c*. The output of the ultrasonic motor 100 accommodated in the main body portion 30*cb* of the third case member 30*c* is transferred to the first unit 10 through the shaft 43.

Figure 8:
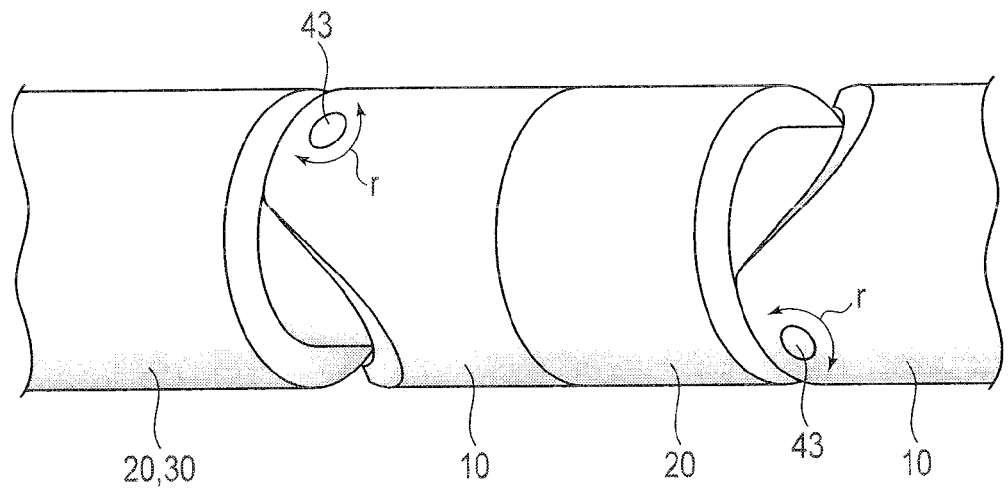
FIG. 8 is a perspective view showing a coupling structure between the first and the second unit/third unit.

The ultrasonic motor unit formed by coupling the first unit 10, second unit 20, and third unit 30 described above has an outer appearance like that shown in FIG. 8. FIG. 8 is a perspective view showing a coupling structure between the first unit 10 and the second unit 20/third unit 30.

As shown in FIG. 8, in the ultrasonic motor unit according to this embodiment, one end (the convex portion 20*ct*2 or 30*ct*) of the second unit 20 (the third unit 30 at the termination portion) accommodating the ultrasonic motor 100 is coupled to one end (through hole portions 10*h*) of the first unit 10 through the shaft 43. The other end (threaded hole portion) of the first unit 10 is connected to one end (convex portion 20*ct*1) of the second unit 20 by being fixed by screwing. The other end (convex portion 20*ct*2) of the second unit 20 is coupled to one end (through hole portions 10*h*) of the first unit 10 through the shaft 43. The ultrasonic motor unit according to this embodiment is formed by alternately coupling and connecting the first and second units in this manner.

With regard to coupling portions between the first unit 10 and the second unit 20 (third unit 30) through the shaft 43, the direction of the shaft 43 (the driving shaft of the driven member 40) between the adjacent coupling portions shifts through 90° in the circumferential direction of the ultrasonic motor unit. This arrangement contributes to an increase in the degree of freedom of the driving directions of the ultrasonic motor unit.

As described above, the first unit 10 is driven by the output of the ultrasonic motor 100 accommodated in the second and third units 20 and 30 coupled and fixed to each other through the shaft 43 (functions as a driving power extraction member). In other words, the first unit 10 forms a joint portion in the ultrasonic motor unit, and is driven to rotate in a specific direction (the direction indicated by an arrow r in FIG. 8) in accordance with the driving shaft of the driven member 40 which is coupled to the first unit 10.

More specifically, the shaft 43 of the second unit 20/third unit 30 which is driven to rotate by the output of the ultrasonic motor 100 is fixed in the through hole portions 10h of the first unit 10 as described above. For this reason, as the shaft 43 rotates (in the direction indicated by the arrow r in FIG. 8), the first unit 10 itself, to which the shaft 43 is fixed, rotates in the same direction by the same amount. The notched portions 10c formed in the first unit 10 expand this range in which the first unit 10 can be driven to rotate.

As described above, this embodiment can provide an ultrasonic motor unit which can achieve both an increase in the degree of freedom of driving directions and a reduction in the size of the device.

That is, the ultrasonic motor unit according to this embodiment can avoid increases in complexity and size of the pressing mechanism, support mechanism, and the like of the ultrasonic motor while achieving an increase in the degree of freedom of driving directions.

Figure 9:
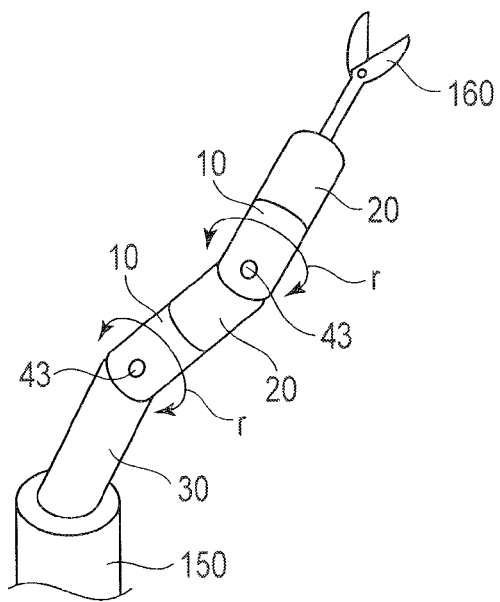
FIG. 9 is a view showing an example of the arrangement of an apparatus to which the ultrasonic motor unit according to an embodiment of the present invention is applied.

The ultrasonic motor unit according to this embodiment can provide an apparatus having various kinds of functions corresponding to applications. FIG. 9 is a view showing an example of the arrangement of an apparatus to which the ultrasonic motor unit according to this embodiment is applied. For the sake of illustrative simplicity, FIG. 9 shows an example of the arrangement of the ultrasonic motor unit according to this embodiment which is constituted by the two first units 10, the two second units 20, and the one third unit 30.

The apparatus shown in FIG. 9 includes the ultrasonic motor unit according to this embodiment, a support portion 150, and an operation unit 160.

The support portion 150 is a member which supports the third unit 30 as the termination portion of the ultrasonic motor unit according to this embodiment.

The operation unit 160 is a device (e.g., scissors) mounted on the first unit 10 or the second unit 20 which is located on the distal end portion of the ultrasonic motor unit according to this embodiment. The operation unit 160 is a device having a desired function in accordance with the application.

The above arrangement provides an apparatus having a high degree of freedom of driving directions and desired functionality.

The above embodiments include inventions of various stages, and various inventions can be extracted by proper combinations of a plurality of disclosed constituent elements. When, for example, the problem described in "Description of the Related Art" can be solved and the effects described in "BRIEF SUMMARY OF THE INVENTION" can be obtained even if several constituent elements are omitted from all the constituent elements in each embodiment, the arrangement from which these constituent elements are omitted can be extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ultrasonic motor unit comprising:
    a piezoelectric element which is provided with a plurality of piezoelectric active regions and has a rectangular cross-sectional shape, and in which longitudinal vibration and bending vibration are excited by applying a predetermined alternating signal to the plurality of piezoelectric active regions to excite elliptic vibration in opposite end faces by combining the vibrations;
    a holder member which holds the piezoelectric element so as to cover an outer surface of a portion of the piezoelectric element which corresponds to a common node of the longitudinal vibration and the bending vibration;
    a pressing member which applies a predetermined pressing force to the piezoelectric element through the holder member;
    a pressing auxiliary member which transfers a pressing force generated by the pressing member to the holder member;
    a driven member which is in contact with one of the opposite end faces of the piezoelectric element and driven by elliptic vibration of the piezoelectric element;
    an ultrasonic motor accommodation member which accommodates the piezoelectric element, the holder member, the pressing member, and at least one portion of the driven member; and
    a power extraction member to which a portion of the driven member accommodated in the ultrasonic motor accommodation member is fixed, and which is coupled to the ultrasonic motor accommodation member to form a joint portion which displaces when the driven member is driven,
    wherein the ultrasonic motor unit is formed by connecting a plurality of sections each formed by coupling the ultrasonic motor accommodation member to the power extraction member.

2. The unit of claim 1, wherein drive shafts of the driven members of adjacent sections of the plurality of connected units define a predetermined angle.

3. The unit of claim 1, wherein the power extraction member includes a notched portion near a portion fixed to the driven member.

4. The unit of claim 1, wherein the holder member comprises a cylindrical member in which a through hole into which the piezoelectric member is inserted is formed, and includes a pair of convex portions protruding in a direction perpendicular to a pressing direction by the pressing member, and
    the ultrasonic motor accommodation member includes rotation restricting groove portions fitted on the convex portions of the holder member.

5. The unit of claim 1, wherein the pressing auxiliary member includes one surface in contact with the holder member and the other surface in contact with the pressing member,
    the one surface having a substantially same shape as that of an end face of the holder member, and
    the other surface having an outer shape larger than the one surface.

6. The unit of claim 4, wherein the pressing auxiliary member includes one surface in contact with the holder member and the other surface in contact with the pressing member,
    the one surface having a substantially same shape as that of an end face of the holder member, and
    the other surface having an outer shape larger than the one surface.

* * * * *